(12) United States Patent
Screen et al.

(10) Patent No.: US 7,512,978 B1
(45) Date of Patent: Mar. 31, 2009

(54) HUMAN-READ-ONLY CONFIGURED E-MAIL

(75) Inventors: David Screen, Winchester (GB); Conor Beverland, Southampton (GB); Joseph Chacko, Sheffield (GB); Megan Beynon, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/036,259

(22) Filed: Feb. 24, 2008

(51) Int. Cl.
*G06F 11/30* (2006.01)
*G06F 15/16* (2006.01)

(52) U.S. Cl. .................. 726/22; 709/206; 709/207

(58) Field of Classification Search ............. None
See application file for complete search history.

(56) References Cited

U.S. PATENT DOCUMENTS

| | | | |
|---|---|---|---|
| 5,666,415 A * | 9/1997 | Kaufman ............... 713/159 |
| 6,327,656 B2 | 12/2001 | Zabetian |
| 7,149,801 B2 | 12/2006 | Burrows et al. |
| 7,197,646 B2 | 3/2007 | Fritz et al. |
| 7,200,576 B2 | 4/2007 | Steeves et al. |
| 7,337,324 B2 * | 2/2008 | Benaloh et al. ............ 713/182 |
| 2004/0015554 A1 * | 1/2004 | Wilson .................. 709/206 |
| 2005/0015455 A1 * | 1/2005 | Liu ..................... 709/207 |
| 2007/0101010 A1 * | 5/2007 | Ellison et al. ............ 709/229 |
| 2007/0143624 A1 | 6/2007 | Steeves |
| 2007/0179905 A1 * | 8/2007 | Buch et al. ................ 705/75 |
| 2007/0201745 A1 | 8/2007 | Wang et al. |
| 2007/0208933 A1 * | 9/2007 | Sudo et al. ............... 713/153 |
| 2007/0208947 A1 * | 9/2007 | Sudo et al. ............... 713/183 |
| 2007/0226804 A1 * | 9/2007 | Somkiran et al. ........... 726/24 |
| 2008/0049939 A1 * | 2/2008 | Canetti et al. ............ 380/277 |

* cited by examiner

*Primary Examiner*—Christian LaForgia
(74) *Attorney, Agent, or Firm*—MaxValueIP, LLC

(57) ABSTRACT

This presentation shows a method to present e-mails to human users only, by encoding the body of the e-mail with a user defined keyword, attaching the distorted image of the keyword to the e-mail and sending it to the intended user. This keyword image is extracted and verified by the user in a CAPTCHA style test on the receive side to authenticate human user participation and then e-mail body is decoded and presented to the intended user.

1 Claim, 3 Drawing Sheets

HUMAN-READ-ONLY CONFIGURED E-MAIL

BACKGROUND OF THE INVENTION

A user sends an e-mail but wants to be confident that it will not be read by an automated text scanning program but can be read by the receiver. Known solutions include using Secured Socket Layer (SSL) encryption, which requires prior distribution of signer certificates or other encryption which requires prior distribution of shared/secret keys is cumbersome and not necessarily required in applications that does not concern with the security and privacy of the message. This system proposes a simple encryption of the text and CAPTCHA (Completely Automated Public Turing test to tell Computers and Humans Apart) style human only test to accomplish this.

A "CAPTCHA" is a type of challenge-response test used in computing to determine whether the user is human. The process involves one computer (a server) asking a user to complete a simple test which the computer is able to generate and grade. Because other computers are unable to solve the CAPTCHA, any user entering a correct solution is presumed to be human. A common type of CAPTCHA requires that the user type the letters of a distorted image, sometimes with the addition of an obscured sequence of letters or digits that appears on the screen.

The term "CAPTCHA" was coined in 2000 and is trademarked by Carnegie Mellon University. A CAPTCHA is sometimes described as a reverse Turing test, because it is administered by a machine and targeted to a human, in contrast to the standard Turing test that is typically administered by a human and targeted to a machine.

SUMMARY OF THE INVENTION

This system proposes a method to present e-mails to human users only, by encoding the body of the e-mail with a user defined keyword or key phrase, and using that keyword's distorted image in a CAPTCHA style test on the receive side to verify a human user participation and then decoding and presenting the e-mail body to the intended user.

User presents the system with a keyword or key phrase, e-mail body is then encrypted using this keyword, this keyword or key phrase is converted to a distorted image and is attached to the body of the e-mail and transmitted to the intended receiver.

The receiver system receives the encrypted e-mail and attached keyword image. This distorted image attachment is then presented to the recipients and is asked to read and interpret. The recipient's interpretation of the keyword image is used to decrypt the encrypted message and if successful, the human readable message is presented to the recipient. If this was not successful, the recipient has the option of repeating this process and eventually decrypts the e-mail message.

DETAILED DESCRIPTION OF THE PREFERRED EMBODIMENTS

This system proposes a method to present e-mails to human users only, by encoding the body of the e-mail with a user defined keyword, and using that keyword in a CAPTCHA style test on the receive side to verify a human user participation and decoding and presenting the e-mail body to the intended user.

Figure 1:
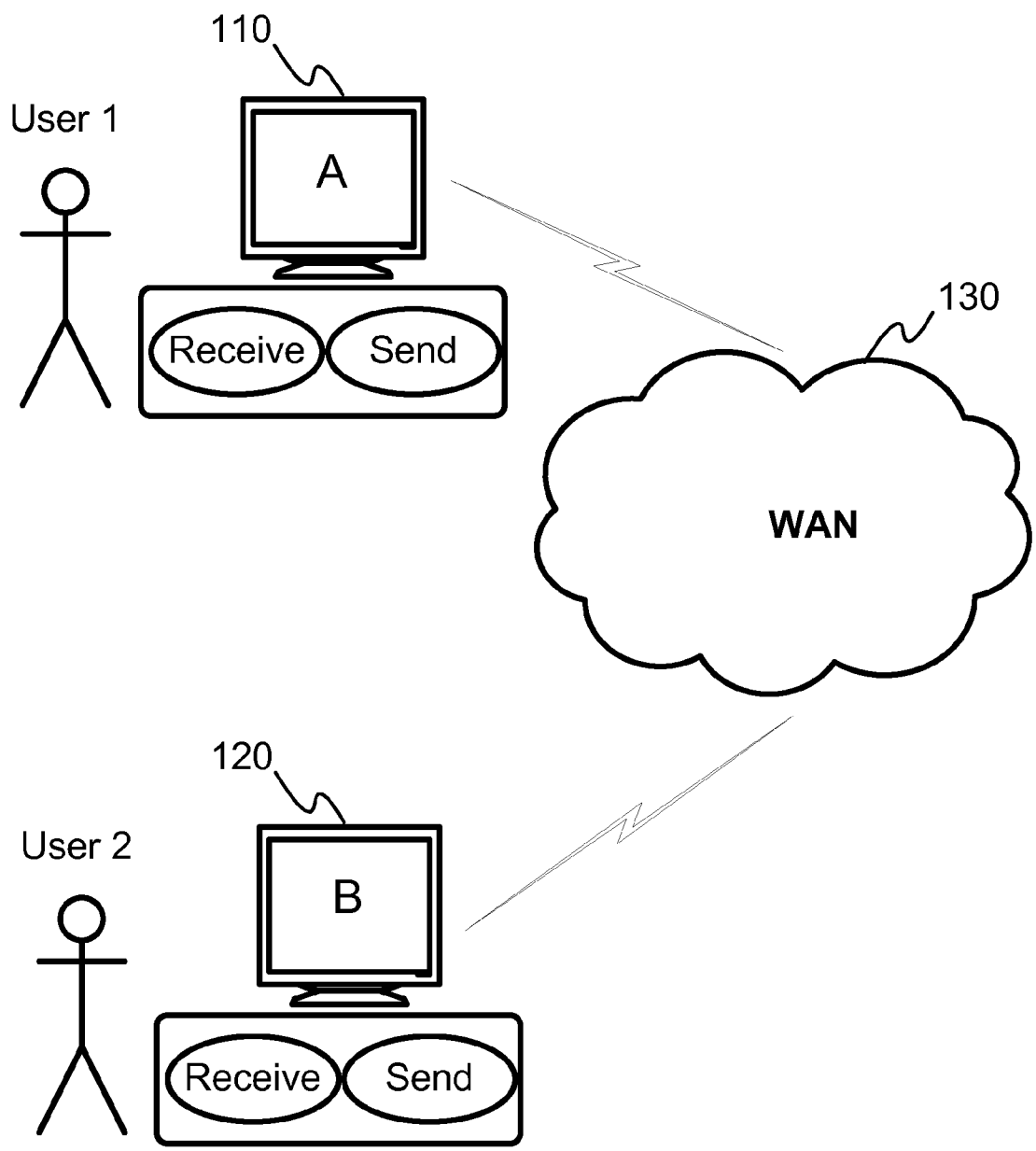
FIG. 1 is the high level view of the proposed human-read-only configured e-mail system.

An embodiment of this system and method could have the following environment as depicted in FIG. 1: Users use any computing device including but not limited to a common Personal Computer (PC), laptop, Personal Digital Assistant (PDA). Each computing device may have an e-mail application and in this embodiment of this system this application may have several logical subsystems which receive and send subsystems are depicted in FIG. 1, 110, and 120. These computing devices are connected to a network configuration including but not limited to Local Area Network (LAN), Wide Area Network (WAN).

In this embodiment of the system, User 1 uses sender portion of system A (FIG. 1, 110) of the proposed system to generate or user personally supplies a "key word". Next, e-mail is encrypted using "key word" as encryption key and distorted version of "key word" is attached as a distorted image. At this point the e-mail message is sent to recipient through a networking media (130) such as a WAN (Wide Area Network) or commonly known as internet. This media could include but not limited to wired or wireless or optical networks.

Once user 2 receives the e-mail, recipient's system B (120) recognizes message body is encrypted and is part of this system. The user 2's received system prompts user 2 to interpret picture attachment. User 2 visually examines the distorted image of the "key word" and enters the "key word" into the system B. At this point System B attempts to decrypt message body using supplied "key word". If this task is successful, the decoded message body is presented and recipient can read the message, otherwise user is prompted again for correct key word.

Another embodiment of this system is a method of configuring an e-mail system. This method is comprised of: a first user generating a message, then encrypting the message using a key word; taking an image of the key word; distorting the image of the key word; wherein the key word has a logical relationship with a related code; attaching the distorted image of the key word to the encrypted message, and sending the encrypted message along with the attached distorted image to a second user; prompting the second user to interpret the attached distorted image; asking the second user to use the interpreted attached distorted image to come up with a first code; the second user enters the first code into the system, using a user interface; if the first code is the same as the related code, then decrypting the encrypted message; and if the first code is not the same as the related code, then prompting the second user to interpret the attached distorted image.

Figure 2:
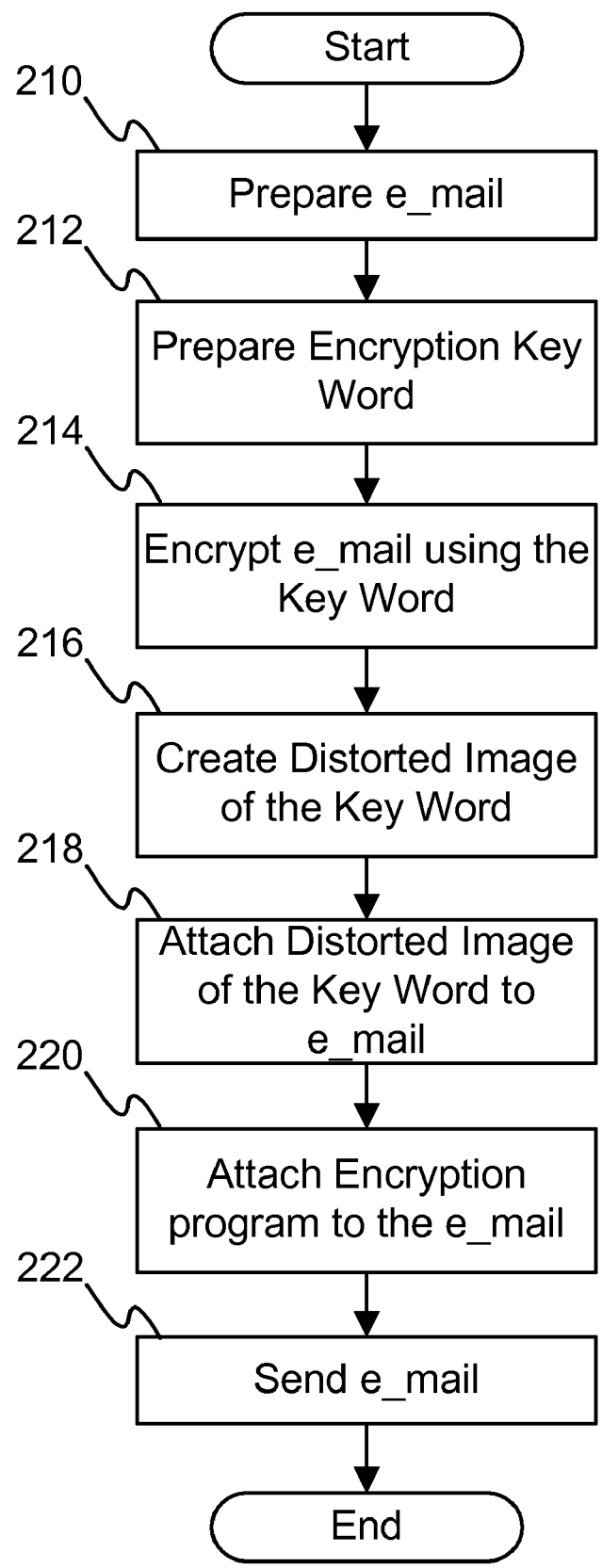
FIG. 2 is the flow diagram of the send side of the proposed human-read-only configured e-mail system.
Figure 3:
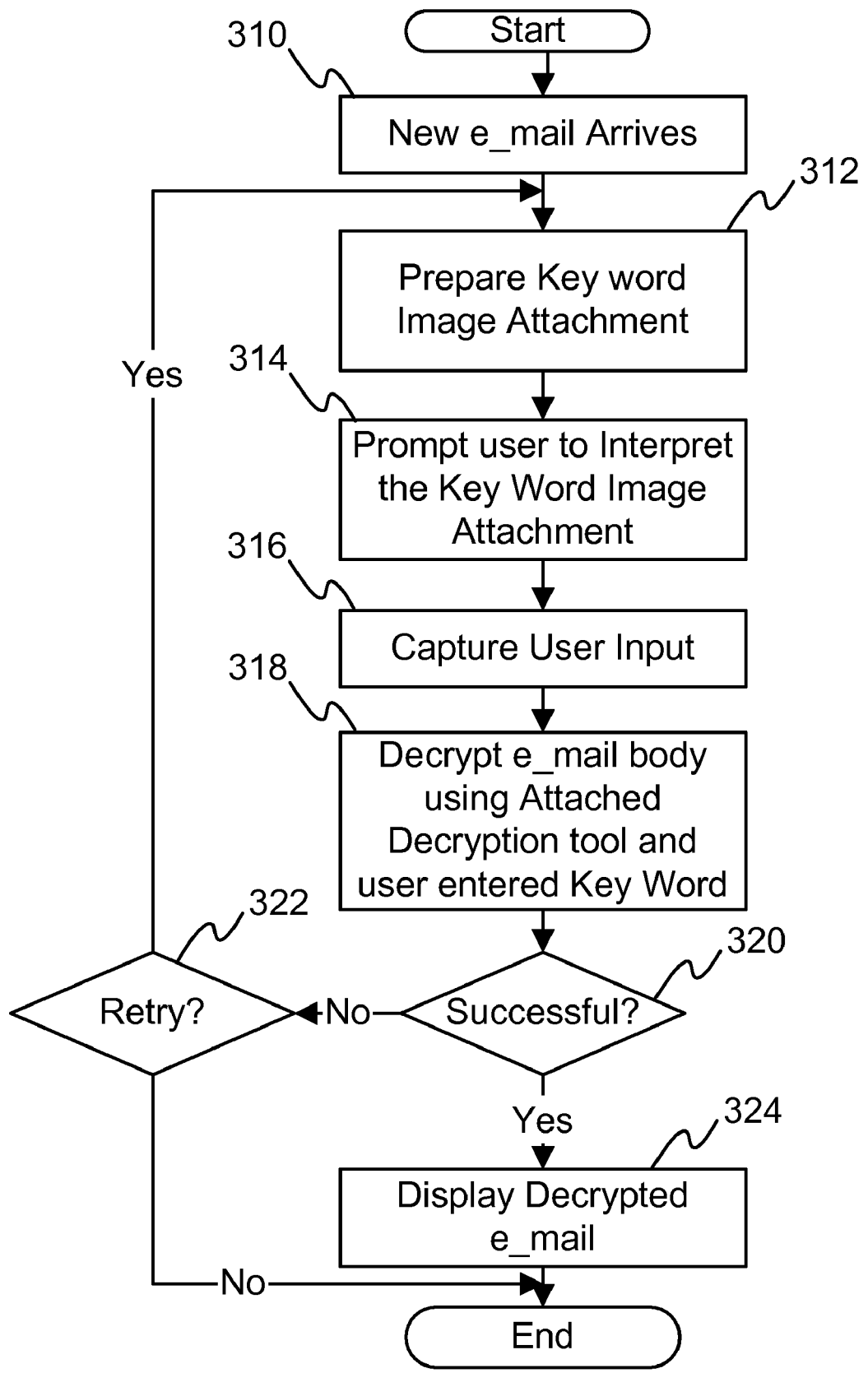
FIG. 3 is flow diagram of the receive side of the proposed human-read-only configured e-mail system.

Another embodiment of this system is depicted in FIGS. 2 and 3. User A prepares an e-mail that must be sent to user B (FIG. 2, step 210). Once the e-mail is prepared, user A prepares an encryption keyword (212). This keyword is not limited to a word, a phrase as it could be any means to distinguish a human participant such as riddles, personal secrets or any other non-machine answerable question which upon verification of human response the encrypted e-mail could be decrypted with this keyword or because of it.

After selection of the encryption key, user A uses an encryption tool to encrypt the body of the e-mail using the selected encryption key (214). This tool could be any symmetric encryption tool which same key is used for encryption and decryption. This encryption tool could be any commercially available tool or any synchronous or reversible encryption tool to make the message unreadable. User A then prepares a distorted image of the keyword (216) which will be used by a CAPTCHA like test on the receiving end to verify the human participant. This distorted key is then attached as an image to the body of the text (218), the encryption tool is also attached to the body of the image (220) and e-mail and its attachments are sent to user B (222).

Once user B receives the e-mail and its attachments (310), the receive side of this system prepares the distorted keyword image attachment and presents it to the user (312). This system then prompts the user to interpret the distorted image and enter the keyword (314). The system then captures the users input (316). This system then uses this input as key and attempts to decrypt the encrypted body of the e-mail using the attached decryption tool (318).

If this attempt was successful (320), body of the image is decrypted and presented to the user in a human readable form (324) and process ends. If this attempt was not successful, the system prompts the user if retry is required (322). If user indicates that retry is required, system prepares the distorted image of the keyword and presents it to user and steps 312-324 repeats. If user indicates that retry is not required, process terminates.

A system, apparatus, or device comprising one of the following items is an example of the invention: human-readable, email, security module, SSL encryption, text scanner, OCR, keys, key word, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of security and email management.

Any variations of the above teaching are also intended to be covered by this patent application.

The invention claimed is:

1. A method of configuring an e-mail system, said method comprising:
   a first user generating a message;
   encrypting said message using a key word;
   taking an image of said key word;
   distorting said image of said key word;
   wherein said key word has a logical relationship with a related code;
   attaching said distorted image of said key word to said encrypted message;
   sending said encrypted message along with said attached distorted image and a decryption tool to a second user;
   prompting said second user to interpret said attached distorted image;
   asking said second user to use said interpreted attached distorted image to come up with said key word and a first code;
   said second user entering said first code into said system, using a user interface;
   said second user entering said key word into said system, using said user interface;
   if said first code is the same as said related code, then decrypting said encrypted message by said decryption tool using said key word; and
   if said first code is not the same as said related code, then prompting said second user to interpret said attached distorted image.

* * * * *